United States Patent
Yonezawa et al.

(10) Patent No.: US 11,052,901 B2
(45) Date of Patent: Jul. 6, 2021

(54) HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/786,214

(22) Filed: Feb. 10, 2020

(65) Prior Publication Data

US 2020/0290592 A1 Sep. 17, 2020

(30) Foreign Application Priority Data

Mar. 14, 2019 (JP) .............................. JP2019-046891

(51) Int. Cl.
*B60W 20/15* (2016.01)
*F02D 41/00* (2006.01)
*B60W 10/06* (2006.01)

(52) U.S. Cl.
CPC ............. *B60W 20/15* (2016.01); *B60W 10/06* (2013.01); *F02D 41/0042* (2013.01); *B60W 2510/0657* (2013.01)

(58) Field of Classification Search
CPC ........................... B60W 20/15; F02D 41/0042
See application file for complete search history.

(56) References Cited

U.S. PATENT DOCUMENTS 8,306,720 B2 * 11/2012 Yamazaki ........... F02D 41/0042
701/103
2009/0292449 A1 11/2009 Yamazaki et al.

FOREIGN PATENT DOCUMENTS

JP 4479830 B2 6/2010
JP 2015-058924 A 3/2015

* cited by examiner

*Primary Examiner* — Derek D Knight
(74) *Attorney, Agent, or Firm* — Sughrue Mion, PLLC

(57) ABSTRACT

A hybrid vehicle includes an engine, a first MG, a second MG, a planetary gear mechanism, and an HV-ECU. The engine includes a supercharger and a purge device. The purge device introduces fuel vapor into an intake passage of the engine. Upon request for fuel purge, when an operating point of the engine is included in an area A, the HV-ECU controls the engine and the first MG to move the operating point to outside of the area A.

9 Claims, 12 Drawing Sheets

HYBRID VEHICLE

This nonprovisional application is based on Japanese Patent Application No. 2019-046891 filed on Mar. 14, 2019 with the Japan Patent Office, the entire contents of which are hereby incorporated by reference.

BACKGROUND

Field

The present disclosure relates to a hybrid vehicle including an internal-combustion engine with a supercharger.

Description of the Background Art

Japanese Patent Application No. 2015-58924 discloses a hybrid vehicle equipped with a motor generator and an internal-combustion engine including a turbo supercharger.

An internal-combustion engine may be provided with a purge device that introduces (purges) evaporated fuel generated in a fuel tank into an intake passage of the internal-combustion engine. The internal-combustion engine including the supercharger may perform, during supercharging by the supercharger, upstream purge in which a differential pressure between downstream and upstream of the supercharger (compressor) is used to introduce purge gas into upstream of the supercharger, and perform, during non-supercharging (natural aspiration (NA)), downstream purge in which a negative pressure in the intake passage is used to introduce purge gas into downstream of the supercharger.

Immediately after the start of supercharging, however, fuel purge (upstream purge) may be performed insufficiently due to a low supercharging pressure and a small differential pressure between downstream and upstream of the supercharger. Also, immediately before the start of supercharging, fuel purge (downstream purge) may be performed insufficiently due to large throttle valve opening.

That is to say, in an engine operating area near a line (supercharge line) at which supercharging is started by the supercharger, fuel purge may be performed insufficiently even when fuel purge by the purge device is requested because of, for example, an increase in vapor density. Japanese Patent Application No. 2015-58924 does not particularly describe a study on such a problem.

SUMMARY

The present disclosure has been made to solve the above problem, and therefore has an object to enable a hybrid vehicle equipped with an internal-combustion engine including a supercharger and a purge device to reliably perform fuel purge upon request for fuel purge by the purge device.

A hybrid vehicle according to the present disclosure includes an internal-combustion engine, a rotating electric machine, a planetary gear mechanism, and a controller. The internal-combustion engine, the rotating electric machine, and an output shaft are connected to the planetary gear mechanism. The controller controls the internal-combustion engine and the rotating electric machine. The internal-combustion engine includes a supercharger and a purge device. The purge device introduces (purges) fuel vapor into an intake passage of the internal-combustion engine. When an operating point of the internal-combustion engine is included in a prescribed area in the case where fuel purge by the purge device is requested, the controller controls the internal-combustion engine and the rotating electric machine to move the operating point to outside of the prescribed area. The prescribed area is an area defined, as an area in which an amount of fuel purge by the purge device is unable to be secured, by a supercharge line indicating a torque of the internal-combustion engine at which supercharging by the supercharger is started.

This hybrid vehicle can control the internal-combustion engine and the rotating electric machine to appropriately change the operating point of the internal-combustion engine. Upon request for fuel purge by the purge device, when the operating point of the internal-combustion engine is included in the prescribed area in which an amount of fuel purge is unable to be secured, the internal-combustion engine and the rotating electric machine are controlled to move the operating point to outside of the prescribed area. This enables fuel purge also upon request for fuel purge by the purge device when the operating point of the internal-combustion engine is included in the prescribed area.

The purge device may include an upstream purge mechanism and a downstream purge mechanism. The upstream purge mechanism introduces fuel vapor into upstream of the supercharger using a differential pressure between downstream and upstream of the supercharger. The differential pressure occurs during supercharging by the supercharger. The downstream purge mechanism introduces fuel vapor into downstream of the supercharger using a negative pressure occurring in the intake passage during non-supercharging. The prescribed area may include a first area and a second area. The first area is defined as an area in which a torque of the internal-combustion engine is greater than that indicated by the supercharge line and an amount of fuel purge by the upstream purge mechanism is unable to be secured. The second area is defined as an area in which a torque of the internal-combustion engine is smaller than that indicated by the supercharge line and an amount of fuel purge by the downstream purge mechanism is unable to be secured.

When the torque of the internal-combustion engine exceeds the torque indicated by the supercharge line, supercharging by the supercharger is performed, and the upstream purge mechanism operates. However, a sufficient amount of fuel purge by the upstream purge mechanism cannot be secured when the differential pressure between downstream and upstream of the supercharger is small. Thus, the first area is defined as an area in which a torque is greater the torque indicated by the supercharge line and an amount of fuel purge by the upstream purge mechanism cannot be secured. Contrastingly, when the torque of the internal-combustion engine does not exceed that of the supercharge line, the supercharger does not operate, and the downstream purge mechanism operates. However, as the operating point approaches the supercharge line and the throttle opening increases, the negative pressure of the intake passage is not generated sufficiently, and accordingly, a sufficient amount of fuel purge by the downstream purge mechanism cannot be secured. Thus, the second area is defined as an area in which a torque is smaller the torque indicated by the supercharge line and an amount of fuel purge by the downstream purge mechanism cannot be secured. Upon request for fuel purge, when the operating point of the internal-combustion engine is included in the first or second area, the internal-combustion engine and the rotating electric machine are controlled to move the operating point to outside of the first and second areas. Consequently, also when the operating point of the internal-combustion engine is included in the prescribed area (first or second area), fuel purge can be performed upon request for fuel purge by the purge device.

The hybrid vehicle may further include a power storage device capable of storing electric power generated by the rotating electric machine. When charging of the power storage device is not restricted and discharging of the power storage device is restricted, the controller may control the internal-combustion engine and the rotating electric machine such that a torque of the internal-combustion engine increases while limiting changes in an engine speed of the internal-combustion engine.

With such a configuration, the operating point of the internal-combustion engine can be moved to outside of the prescribed area, and an output excess of the internal-combustion engine which is associated with moving of the operating point can be absorbed by the power storage device.

When discharging of the power storage device is not restricted and charging of the power storage device is restricted, the controller may control the internal-combustion engine and the rotating electric machine such that a torque of the internal-combustion engine decreases while limiting changes in an engine speed of the internal-combustion engine.

With such a configuration, the operating point of the internal-combustion engine can be moved to outside of the prescribed area, and a lack of output of the internal-combustion engine which is associated with moving of the operating point can be compensated for by the output from the power storage device.

When charging and discharging of the power storage device are restricted, the controller may control the internal-combustion engine and the rotating electric machine such that a torque of the internal-combustion engine decreases while limiting changes in power of the internal-combustion engine.

Such a configuration can move the operating point of the internal-combustion engine to outside of the prescribed area while limiting an input/output of the power storage device. Also, since the operating point moves in a direction in which torque decreases, the internal-combustion engine can be operated in an NA area with a higher degree of torque accuracy than in the supercharging area in which the supercharger operates.

In the above hybrid vehicle, an operation line may be set, where the operation line defines a recommended operating point of the internal-combustion engine in accordance with requested power for the internal-combustion engine. During moving of the operating point along the operation line, when fuel purge by the purge device is requested and the operating point passes through the prescribed area along with an increase in the requested power, before the operating point reaches the prescribed area, the controller may control the internal-combustion engine and the rotating electric machine such that a torque of the internal-combustion engine does not increase, and upon an engine speed of the internal-combustion engine reaching a value at which a torque of the internal-combustion engine exceeds that of the prescribed area on the operation line, the controller may control the internal-combustion engine and the rotating electric machine such that a torque of the internal-combustion engine exceeds that of the prescribed area while limiting changes in the engine speed.

With such a configuration, when the operating point passes through the prescribed area along with an increase in requested power, a period of time in which the operating point of the internal-combustion engine is located within the prescribed area can be made as short as possible. This can avoid an insufficient amount of fuel purge.

When charging of the power storage device is restricted, before the operating point reaches the prescribed area, the controller may control the internal-combustion engine and the rotating electric machine such that a torque of the internal-combustion does not increase, and may control, upon power of the internal-combustion engine reaching a value at which a torque of the internal-combustion exceeds that of the prescribed area, the controller may control the internal-combustion engine and the rotating electric machine such that a torque of the internal-combustion exceeds that of the prescribed area while limiting changes in power.

When torque is increased with changes in the engine speed of the internal-combustion engine limited, a degree of increase in power increases during increase in torque. When charging of the power storage device is restricted, thus, an output excess of the internal-combustion engine which is associated with an increase in torque cannot be absorbed by the power storage device. Contrastingly, when torque is increased with changes in power limited, the operating point can be moved quickly in power management. This hybrid vehicle is thus configured as described above when charging of the power storage device is restricted. Consequently, a period of time in which the operating point of the internal-combustion engine is located within the prescribed area can be made as short as possible even when charging of the power storage device is restricted.

During moving of the operating point along the operation line, when fuel purge by the purge device is requested and the operating point passes through the prescribed area along with a decrease in requested power, before the operating point reaches the prescribed area, the controller may control the internal-combustion engine and the rotating electric machine such that a torque of the internal-combustion engine does not decrease, and upon an engine speed of the internal-combustion engine reaching a value at which a torque of the internal-combustion engine falls below that of the prescribed area on the operation line, the controller may control the internal-combustion engine and the rotating electric machine such that a torque of the internal-combustion engine falls below that of the prescribed area while limiting changes in the engine speed.

With such a configuration, when the operating point passes through the prescribed area along with a decrease in requested power, a period of time in which the operating point of the internal-combustion engine is located within the prescribed area can be made as short as possible. This can avoid an insufficient amount of fuel purge.

When discharging of the power storage device is restricted, the controller may control the internal-combustion engine and the rotating electric machine such that a torque of the internal-combustion engine decreases while limiting changes in the power of the internal-combustion engine, and upon a torque of the internal-combustion engine falling below that of the prescribed area, the controller may control the internal-combustion engine and the rotating electric machine such that a torque of the internal-combustion engine does not increase until the operating point reaches the operation line.

When torque is reduced with changes in the engine speed of the internal-combustion engine limited, a degree of decrease in power increases during decrease in torque. When discharging of the power storage device is restricted, thus, a lack of output of the internal-combustion engine which is associated with the decrease in torque cannot be compensated for by the output of the power storage device. Contrastingly, when torque is reduced with changes in power limited, the operating point can be moved quickly in power management. This hybrid vehicle is thus configured as described above when discharging of the power storage device is restricted. Consequently, a period of time in which the operating point of the internal-combustion engine is located within the prescribed area can be made as short as possible even when discharging of the power storage device is restricted.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
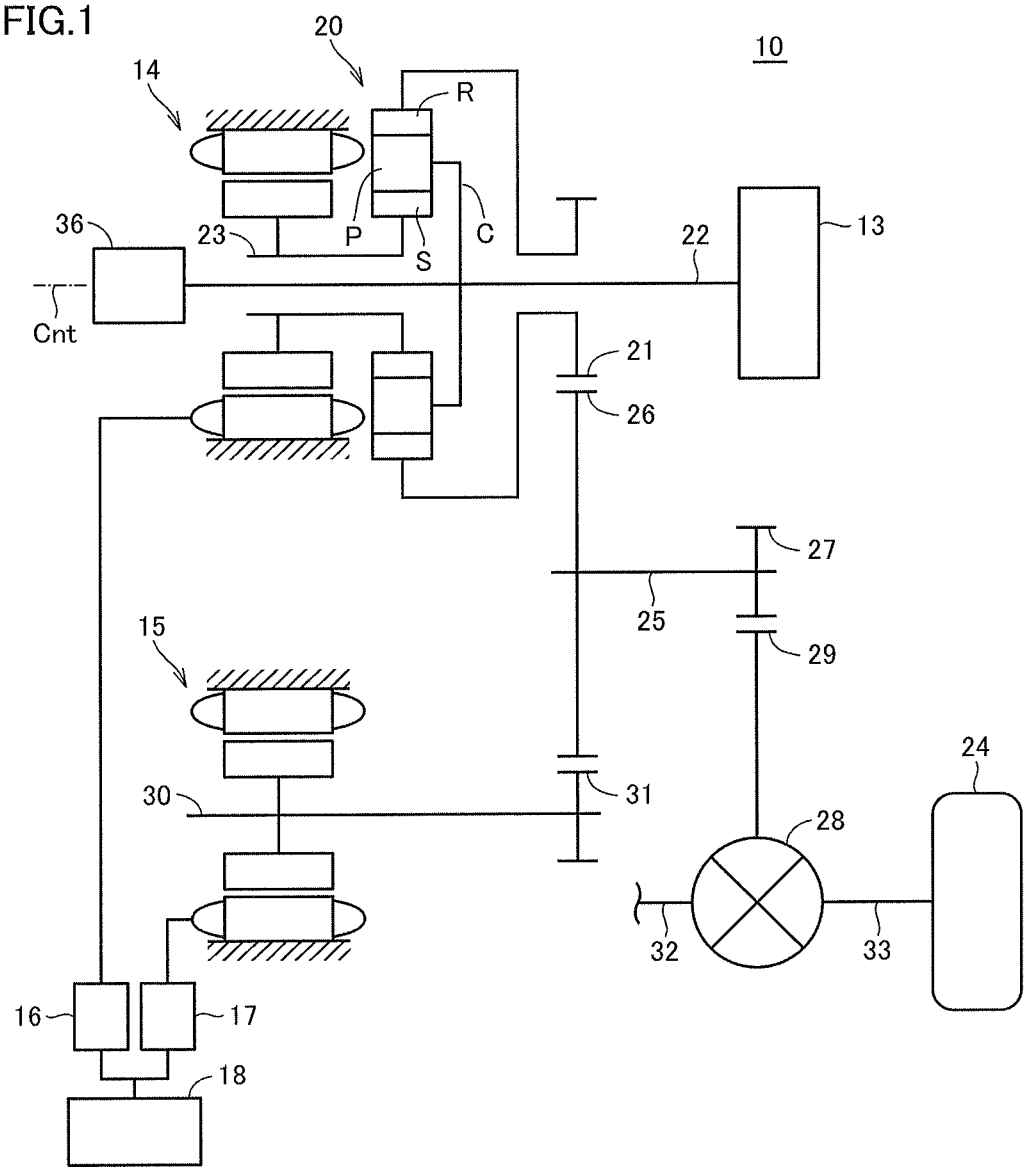
FIG. 1 shows a general configuration of a hybrid vehicle according to an embodiment of the present disclosure.

An embodiment of the present disclosure will now be described in detail with reference to the drawings. The same or common parts will be designated by the same reference numerals in the drawings, and the description thereof will not be repeated.

<Configuration of Hybrid Vehicle>

FIG. 1 shows a general configuration of a hybrid vehicle according to an embodiment of the present disclosure. With reference to FIG. 1, a hybrid vehicle 10 includes an engine 13, a first motor generator (hereinafter referred to as "first MG") 14, a second MG 15, and a planetary gear mechanism 20. First MG 14 and second MG 15 may be referred to as "MG1" and "MG2," respectively.

Both of first MG 14 and second MG 15 are rotating electric machines having a function as a motor that is supplied with power to output torque and a power generation function as a power generator that is supplied with torque to generate power. First MG 14 and second MG 15 are, for example, alternating-current (AC) motors, such as permanent magnet synchronous motors or induction motors. First MG 14 is electrically connected to a power storage device 18 through an electric circuit including a first inverter 16. Second MG 15 is electrically connected to power storage device 18 through an electric circuit including a second inverter 17.

Power storage device 18 is a rechargeable power storage element. For example, power storage device 18 includes a secondary battery, such as a lithium-ion battery or nickel-hydrogen battery, and a power storage element, such as an electric double layer capacitor. The lithium-ion secondary battery is a secondary battery including lithium as charge carriers, and can include a typical lithium ion secondary battery containing a liquid electrolyte, as well as an all-solid-state battery containing a solid electrolyte.

Power storage device 18 can receive power generated by first MG 14 through first inverter 16 and store the power, and can supply the stored power to second MG 15 through second inverter 17. Power storage device 18 can also receive power generated by second MG 15 during, for example, deceleration of a vehicle through second inverter 17 and store the power, and can supply the stored power to first MG 14 through first inverter 16, for example, at start of engine 13.

Engine 13 and first MG 14 are coupled to planetary gear mechanism 20. Planetary gear mechanism 20 divides torques output from engine 13 to first MG 14 and an output gear 21 for transmission. Planetary gear mechanism 20 is of single pinion type, and is placed on an axis Cnt same as that of an output shaft 22 of engine 13.

Planetary gear mechanism 20 includes a sun gear S, a ring gear R, which is disposed concentrically with sun gear S, pinion gears P, which are in engagement with sun gear S and ring gear R, and a carrier C, which holds pinion gears P to allow rotation and revolution of pinion gears P. Output shaft 22 of engine 13 is coupled to carrier C. A rotation shaft 23 of first MG 14 is coupled to sun gear S. Ring gear R is coupled to output gear 21.

Carrier C to which an output torque of engine 13 is transmitted functions as an input element, ring gear R that outputs torque to output gear 21 functions as an output element, and sun gear S coupled with rotation shaft 23 of first MG 14 functions as a reaction force element. In other words, planetary gear mechanism 20 divides outputs of engine 13 to the first MG 14 side and the output gear 21 side. First MG 14 is controlled to output a torque corresponding to the output torque of engine 13.

A countershaft 25 is disposed parallel to axis Cnt. Countershaft 25 is provided with a driven gear 26, which engages with output gear 21. Countershaft 25 is additionally provided with a drive gear 27, and drive gear 27 is in engagement with a ring gear 29 in a differential gear 28. Driven gear 26 is in engagement with a drive gear 31, which is provided on rotation shaft 30 of second MG 15. The output torque of second MG 15 is thus added to a torque output from output gear 21 in driven gear 26. The resultant torque is transmitted to a drive wheel 24 through drive shafts 32 and 33 extending laterally from differential gear 28.

Output shaft 22 of engine 13 is provided with a mechanical oil pump 36. Oil pump 36 feeds a lubricant having a cooling function to, for example, planetary gear mechanism 20, first MG 14, second MG 15, and differential gear 28.

Although hybrid vehicle 10 includes second MG 15 in this example, second MG 15 may be omitted. In this case, drive gear 31 may be omitted. Alternatively, hybrid vehicle 10 may have a four wheel drive (4WD) configuration so as to drive two wheels different from drive wheel 24 using second MG.

Figure 2:
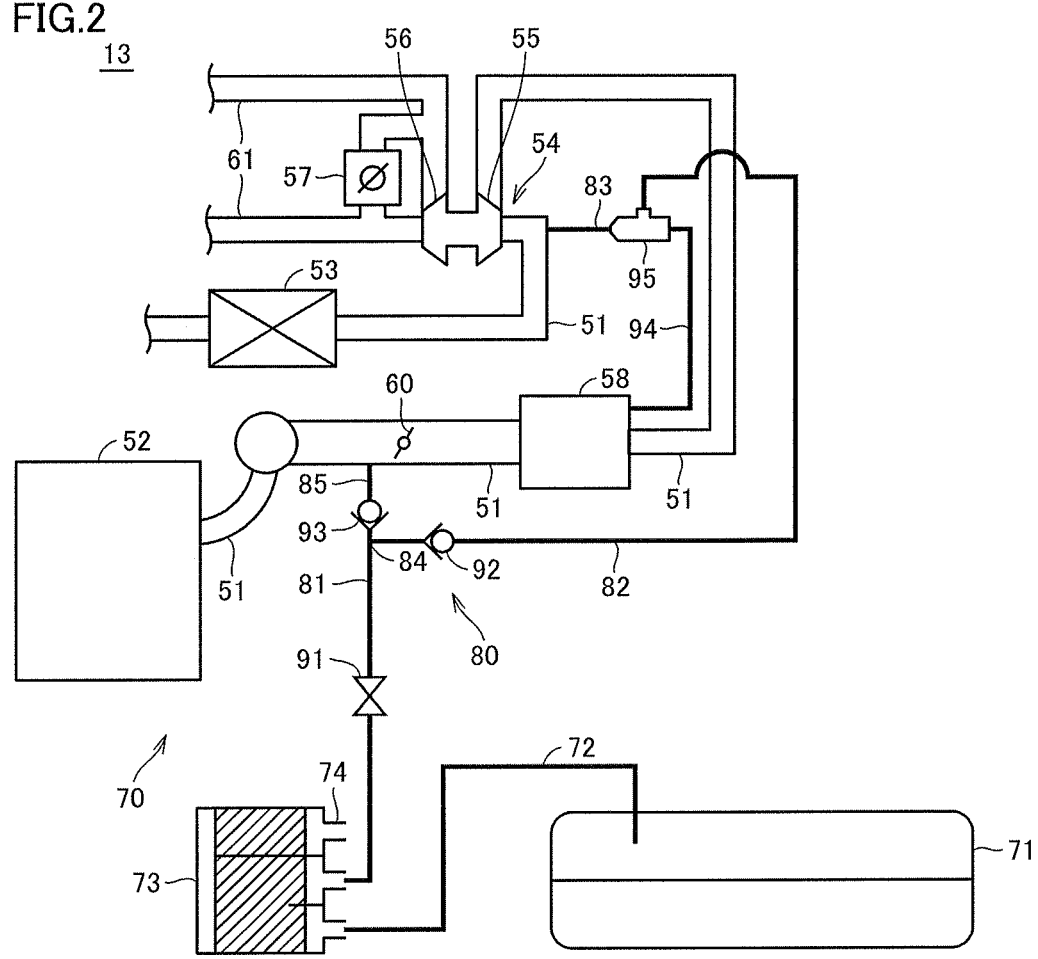
FIG. 2 shows an example configuration of an engine.

FIG. 2 shows an example configuration of engine 13. With reference to FIG. 2, engine 13 includes an engine main body 52, a supercharger 54, and a purge device 70. An intake passage 51 is provided with an air cleaner 53, a compressor 55 of supercharger 54, an intercooler 58, and a throttle valve 60 in order from the intake upstream side. An exhaust passage 61 is provided with a turbine 56 of supercharger 54, and a waste gate valve (hereinafter referred to as "WGV") mechanism including a WGV 57.

Supercharger 54 includes compressor 55 provided in intake passage 51 and turbine 56 provided in exhaust passage 61. The WGV mechanism is configured to bypass exhaust air upstream of turbine 56 to downstream of turbine 56. WGV 57 adjusts the flow rate of exhaust air introduced into turbine 56. Controlling an opening of WGV 57 can adjust the flow rate of the exhaust air introduced into turbine 56, that is, the supercharging pressure of intake air. The exhaust air passing through turbine 56 or WGV 57 is emitted to the atmosphere through a catalytic device (not shown).

Purge device 70 includes a canister 73 and a purge passage 80. Canister 73 is provided with an adsorbing material, for example, activated carbon, that collects fuel vapor generated in fuel tank 71. Purge passage 80 introduces (purges) purge gas containing the fuel vapor collected by canister 73 into intake passage 51. Fuel tank 71 and canister 73 are connected to each other by a passage 72.

Purge passage 80 extends from canister 73 and is connected to upstream of compressor 55 in intake passage 51. A branch passage 85 is connected to some midpoint in purge passage 80. Branch passage 85 is connected to downstream of throttle valve 60 in intake passage 51. Additionally, an ejector 95 is provided at some midpoint in purge passage 80 and downstream of a branch portion 84 of branch passage 85. In other words, purge passage 80 is composed of a first passage 81, which extends from canister 73 to branch portion 84, a second passage 82, which extends from branch portion 84 to ejector 95, and a third passage 83, which extends from ejector 95 to a portion at which purge passage 80 is connected with intake passage 51.

A flow regulating valve 91 is provided at some midpoint in first passage 81, and an opening of flow regulating valve 91 is controlled to adjust the flow rate of purge gas flowing from first passage 81 into second passage 82 or branch passage 85. Second passage 82 is provided with a one-way valve 92, which permits only a flow of purge gas from branch portion 84 toward ejector 95 and does not permit a flow in the opposite direction. Similarly, branch passage 85 is provided with a one-way valve 93, which permits only a flow of purge gas from branch portion 84 toward the portion at which branch passage 85 is connected with intake passage 51 and does not permit a flow in the opposite direction.

Ejector 95 is connected with an inflow passage 94, which is connected to intercooler 58. Inflow passage 94, as well as second passage 82 and third passage 83 communicate with the interior of ejector 95. Third passage 83 is connected to upstream of compressor 55 in intake passage 51.

While the operation of engine 13 is stopped, flow regulating valve 91 is closed. An air-fuel mixture of the fuel vapor generated in fuel tank 71 and air is introduced into canister 73 through passage 72. The fuel vapor in the air-fuel mixture introduced into canister 73 is collected by the adsorbing material of canister 73, and the air after the removal of the fuel vapor from the air-fuel mixture is discharged to outside of canister 73 from an atmosphere communication passage 74 of canister 73.

Contrastingly, during operation of engine 13, flow regulating valve 91 is opened on a condition that a prescribed purge execution condition is satisfied. Opening flow regulating valve 91 causes desorption of fuel vapor from the adsorbing material of canister 73 owing to the air flowing into canister 73 through atmosphere communication passage 74, so that the purge gas including the desorbed fuel vapor is introduced into intake passage 51.

The circulation channel of purge gas differs depending on whether supercharger 54 is performing supercharging. During supercharging, purge gas is introduced into intake passage 51 through purge passage 80. During supercharging, the pressure downstream of compressor 55 is higher, causing a difference in the pressure in intake passage 51 between upstream and downstream of compressor 55. As this pressure difference increases, the pressurized gas downstream of compressor 55 flows from intercooler 58 into inflow passage 94 to be taken into ejector 95. The gas taken into ejector 95 circulates upstream of compressor 55 through third passage 83.

The force of the gas flowing through inflow passage 94 and third passage 83 then acts on ejector 95, causing negative pressure in the interior space of ejector 95. When negative pressure is generated in the interior space of ejector 95, purge gas is sucked from second passage 82 into ejector 95. The purge gas sucked into ejector 95 is then introduced into intake passage 51 through third passage 83, together with the gas which has flowed into ejector 95 through inflow passage 94.

Ejector 95 corresponds to an "upstream purge mechanism" that introduces (purges) purge gas into upstream of compressor 55 of supercharger 54, whereas branch passage 85 corresponds to a "downstream purge mechanism" that introduces purge gas into downstream of compressor 55. Ejector 95 being the upstream purge mechanism acts during supercharging by supercharger 54. Contrastingly, while supercharging is not performed, purge gas is introduced into intake passage 51 through first passage 81 and branch passage 85 with the use of the negative pressure generated downstream of throttle valve 60.

The fuel vapor in the purge gas introduced into intake passage 51 is burned in a combustion chamber of engine main body 52 for processing.

Figure 3:
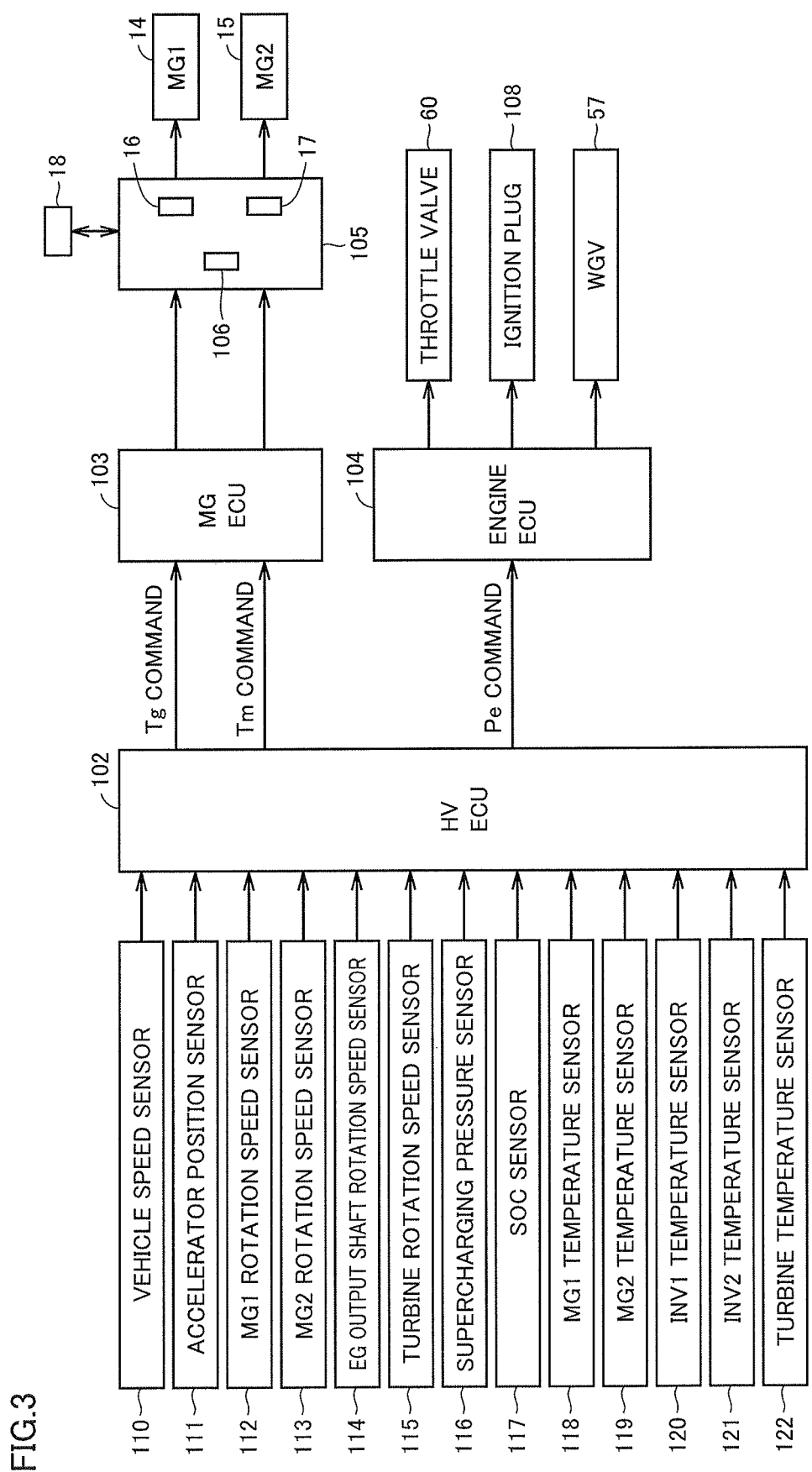
FIG. 3 shows an example control system of the hybrid vehicle shown in FIG. 1.

FIG. 3 shows an example control system of hybrid vehicle 10 shown in FIG. 1. Referring to FIG. 3, the control system includes an HV-ECU 102, an MG-ECU 103, and an engine ECU 104. HV-ECU 102 is connected with a vehicle speed sensor 110, an accelerator position sensor 111, an MG1 rotation speed sensor 112, an MG2 rotation speed sensor 113, an EG output shaft rotation speed sensor 114, a turbine rotation speed sensor 115, and a supercharging pressure sensor 116. HV-ECU 102 is additionally connected with a state of charge (SOC) sensor 117, an MG1 temperature sensor 118, an MG2 temperature sensor 119, an INV1 (first inverter 16) temperature sensor 120, an INV2 (second inverter 17) temperature sensor 121, and a turbine temperature sensor 122.

Vehicle speed sensor 110 outputs a signal corresponding to the vehicle speed to HV-ECU 102. Accelerator position sensor 111 outputs a signal corresponding to an accelerator pedal depressing amount to HV-ECU 102. MG1 rotation speed sensor 112 outputs a signal corresponding to the rotational speed of first MG 14 to HV-ECU 102. MG2 rotation speed sensor 113 outputs a signal corresponding to the rotational speed of second MG 15 to HV-ECU 102. EG output shaft rotation speed sensor 114 outputs a signal corresponding to the rotational speed of output shaft 22 of engine 13 to HV-ECU 102. Turbine rotation speed sensor 115 outputs a signal corresponding to the rotational speed of turbine 56 of supercharger 54 to HV-ECU 102. Supercharging pressure sensor 116 outputs a signal corresponding to the supercharging pressure (pressure downstream of compressor 55) by supercharger 54 to HV-ECU 102.

SOC sensor 117 outputs, to HV-ECU 102, a signal corresponding to the ratio of remaining capacity to a fully charged capacity of power storage device 18. MG1 temperature sensor 118 outputs, to HV-ECU 102, a signal corresponding to the temperature of first MG 14, for example, the temperature relating to a coil or magnet of first MG 14. MG2 temperature sensor 119 outputs, to HV-ECU 102, a signal corresponding to the temperature of second MG 15, for example, the temperature relating to a coil or magnet of second MG 15. INV1 temperature sensor 120 outputs, to HV-ECU 102, a signal corresponding to the temperature of first inverter 16, for example, the temperature relating to a switching element. INV2 temperature sensor 121 outputs, to HV-ECU 102, a signal corresponding to the temperature of second inverter 17, for example, a temperature relating to a switching element. Turbine temperature sensor 122 outputs a signal corresponding to the temperature of turbine 56 to HV-ECU 102.

HV-ECU 102 is a controller for cooperatively controlling engine 13, first MG 14, and second MG 15. HV-ECU 102 includes, for example, an I/O device that controls the transmission and reception of signals, a storage device (including ROM, RAM, etc.) provided for storing various control programs or maps, a central processing unit (CPU) that executes a control program, and a counter for timing.

Hybrid vehicle 10 can be set to or switched between a traveling mode in which engine 13 serves as a power source (hereinafter referred to as "HV traveling mode") and a traveling mode in which second MG 15 is driven by the power stored in power storage device 18 for traveling (hereinafter referred to as an "EV traveling mode"). HV-ECU 102 sets and switches the modes. The EV traveling mode is, for example, a mode selected for a low-load operation area with low vehicle speed and low requested driving force. In this mode, engine 13 is stopped, and the output torque of second MG 15 is used as a traveling drive source. The HV traveling mode is a mode selected for a high-load operation area with high vehicle speed and high requested driving force. In this mode, the torque obtained by adding together the output torque of engine 13 and the output torque of second MG 15 is used as a traveling drive source.

In the HV traveling mode, first MG 14 causes the reaction force to act on planetary gear mechanism 20 in the transmission of the torque output from engine 13 to drive wheel 24. Sun gear S thus functions as the reaction force element. In other words, in order to cause the torque corresponding to a target engine torque based on an acceleration request to act on drive wheel 24, first MG 14 outputs a reaction force torque to the target engine torque.

Specifically, HV-ECU 102 determines requested driving force in accordance with an accelerator position set according to the accelerator pedal depression amount or a vehicle speed, and obtains requested power of engine 13 from the requested driving force. HV-ECU 102 controls the vehicle while switching the traveling mode so as to obtain an optimum system efficiency for the requested power. Further, HV-ECU 102 determines, from the requested power of engine 13, an engine operating point (rotation speed and torque) at which, for example, the smallest fuel consumption of engine 13 is obtained.

The torque and rotation speed of first MG 14 are controlled such that engine 13 operates at the above operating point. First MG 14 can optionally control the torque and rotation speed in accordance with a value of a current to be passed or a frequency thereof. HV-ECU 102 then controls engine 13, first MG 14, and second MG 15 such that the requested driving force set in accordance with the accelerator position or vehicle speed is output to output gear 21 (drive wheel 24) during the HV traveling mode.

HV-ECU 102 outputs, to MG-ECU 103, a command for instructing a torque Tg that HV-ECU 102 causes first MG 14 to generate (Tg command) and a command for instructing a torque Tm that HV-ECU 102 causes second MG 15 to generate (Tm command). HV-ECU 102 also outputs, to engine ECU 104, a command for instructing power Pe that HV-ECU 102 causes engine 13 to generate (Pe command).

MG-ECU 103 generates signals for driving first MG 14 and second MG 15 based on the instructions received from HV-ECU 102 and outputs the signals to a power control unit (PCU) 105. PCU 105 includes first inverter 16 that drives first MG 14, second inverter 17 that drives second MG 15, and a converter 106, which performs voltage conversion between power storage device 18 and first and second MGs 14 and 15.

Engine ECU 104 performs various types of control on the components of engine 13, such as throttle valve 60, an ignition plug 108, and WGV 57, based on the Pe command received from HV-ECU 102.

When a torque Te of engine 13 exceeds a prescribed level (supercharge line) upon, for example, depression of the accelerator pedal, HV-ECU 102 requests supercharging by supercharger 54, and requests an increase in supercharging pressure along with an increase in torque Te. Notification of the request for supercharging and the request for an increase in supercharging pressure is provided to engine ECU 104, and engine ECU 104 controls WGV 57 in the direction of closing. In the absence of the request for supercharging, WGV 57 is fully opened.

Although FIG. 3 shows an example in which HV-ECU 102, MG-ECU 103, and engine ECU 104 are configured as individual ECUs, these ECUs may be collectively configured as one ECU.

<Amount of Fuel Purge by Purge Device 70>

When the HV traveling mode is selected (i.e., during operation of engine 13), in the supercharging area in which supercharging by supercharger 54 is performed, the upstream purge mechanism including ejector 95 performs fuel purge to upstream of compressor 55 of supercharger 54, as described above. Contrastingly, in the NA area in which supercharging is not performed, the downstream purge mechanism including branch passage 85 performs fuel purge to downstream of compressor 55 (more specifically, downstream of throttle valve 60).

Immediately after the start of supercharging, however, ejector 95 may perform fuel purge (upstream purge) insufficiently due to a low supercharging pressure and a small differential pressure between downstream and upstream of compressor 55. Also, immediately before the start of supercharging, fuel purge (downstream purge) using the negative pressure in intake passage 51 may be performed insufficiently due to an increased opening of throttle valve 60. In other words, in the engine operation area near the supercharge line at which supercharging is started, even when fuel purge by purge device 70 is requested due to, for example, an increased vapor concentration, fuel purge may be performed insufficiently.

Therefore, in hybrid vehicle 10 according to the present embodiment, upon request for fuel purge by purge device 70, when the operating point of engine 13 is included in the area in which an amount of fuel purge cannot be secured, the operating point of engine 13 is moved to outside of the area. Consequently, the amount of fuel purge cannot be secured.

Figure 4:
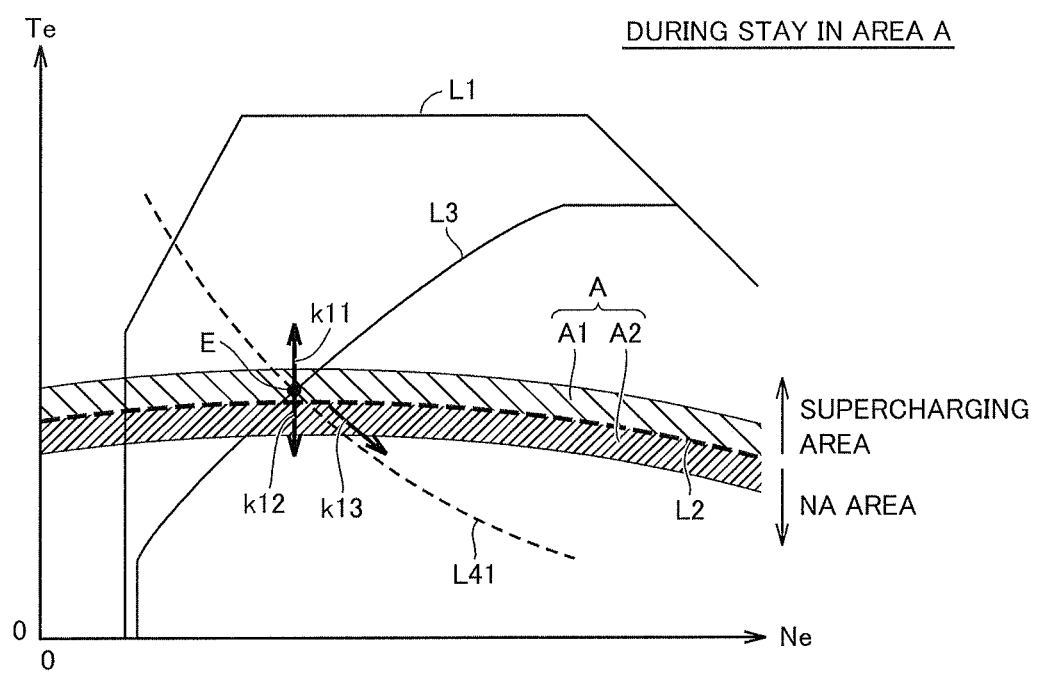
FIG. 4 is a chart for illustrating an operating point of the engine.

FIG. 4 is a chart for illustrating the operating point of engine 13. The vertical axis of FIG. 4 represents a torque Te of engine 13, and the horizontal axis of FIG. 4 represents an engine speed Ne of engine 13.

Referring to FIG. 4, a line L1 represents a maximum torque that can be output from engine 13. A dotted line L2 represents a line (supercharge line) at which supercharging by supercharger 54 is started. When torque Te of engine 13 exceeds supercharge line L2, WGV 57 which has been fully open is operated in the direction of closing. Adjusting an opening of WGV 57 can adjust the flow rate of exhaust air flowing into turbine 56 of supercharger 54 to adjust the supercharging pressure of the intake air through compressor 55. When torque Te falls below a torque indicated by supercharge line L2, WGV 57 can be fully opened to cause supercharger 54 not to operate.

The upstream purge mechanism performs upstream purge in the supercharging area in which torque Te is greater than the torque indicated by supercharge line L2, and the downstream purge mechanism performs downstream purge in the NA area in which torque Te is smaller than the torque indicated by supercharge line L2.

Herein, in area A1 near supercharge line L2 in the supercharging area, the amount of fuel purge by upstream purge is small due to a small differential pressure between downstream and upstream of compressor 55. Thus, upon request for fuel purge by purge device 70 due to, for example, an increased fuel adsorption amount of canister 73, when the operating point of engine 13 is located within area A1, a sufficient amount of fuel purge (a purge amount by upstream purge) cannot be secured.

Contrastingly, in area A2 near supercharge line L2 in NA area, little negative pressure in intake passage 51 has been generated, leading to a smaller amount of fuel purge by downstream purge. Thus, upon request for fuel purge, a sufficient amount of fuel purge (purge amount by downstream purge) cannot be secured also when the operating point of engine 13 is located within area A2.

Thus, upon request for fuel purge, when the operating point of engine 13 is located within area A (A1 or A2) as shown in FIG. 4, the operating point is moved to outside of area A. Hybrid vehicle 10 can control engine 13 and first MG 14 to change the operating point of engine 13. Also, the final vehicle driving force is adjustable by controlling second MG 15, and accordingly, the operating point of engine 13 can be moved to outside of area A while the vehicle drive force is adjusted (e.g., maintained). A way of moving the operating point of engine 13 will now be described.

Figure 5:
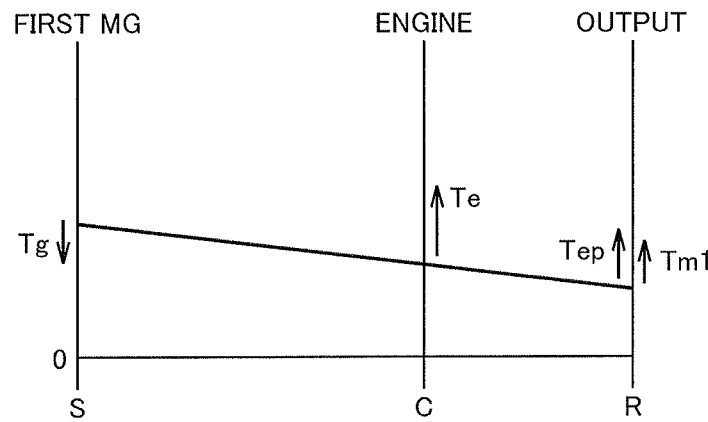
FIG. 5 is a nomographic chart showing the relationship between the rotation speed and torque of an engine, a first MG, and a second MG before the operating point of an engine is changed.
Figure 6:
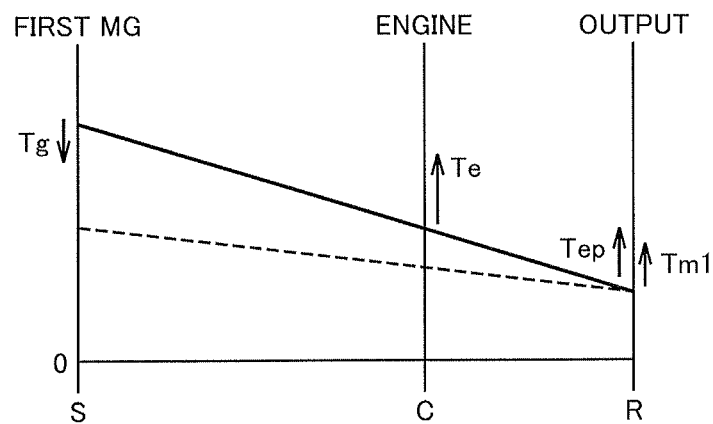
FIG. 6 is a nomographic chart showing the relationship between the rotation speed and torque of the engine, the first MG, and the second MG when the rotation speed of the engine is increased.
Figure 7:
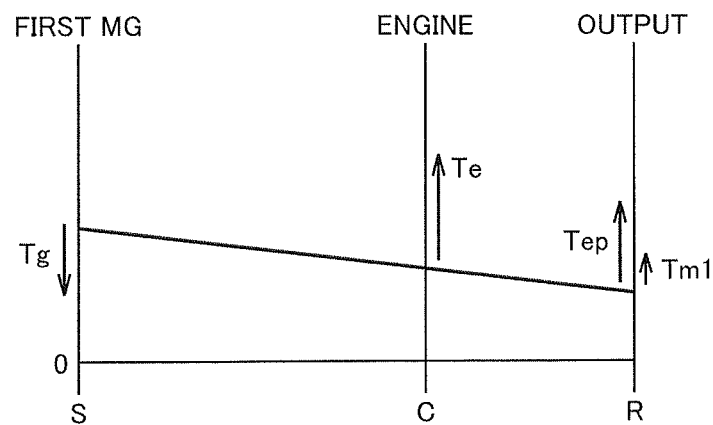
FIG. 7 is a nomographic chart showing the relationship between the rotation speed and torque of the engine, the first MG, and the second MG when the torque of the engine is increased.

FIGS. 5 to 7 are nomographic charts showing the relationship between the rotation speed and torque of engine 13, first MG 14, and the output element. FIG. 5 is a nomographic chart showing the relationship between the rotation speed and torque of the respective elements before the operating point of engine 13 is changed. FIG. 6 is a nomographic chart showing the relationship between the rotation speed and torque of the respective elements when engine speed Ne of engine 13 is increased from the state shown in FIG. 5. FIG. 7 is a nomographic chart showing the relationship between the rotation speed and torque of the respective elements when torque Te of engine 13 is increased from the state shown in FIG. 5.

In each of FIGS. 5 to 7, the output element is ring gear R coupled to countershaft 25 (FIG. 1). Positions on the vertical axis represent the rotation speeds of the respective elements (engine 13, first MG 14, and second MG 15), and spacings between the vertical axes represent the gear ratio of planetary gear mechanism 20. "Te" represents a torque of engine 13, and "Tg" represents a torque of first MG 14. "Tep" represents a direct torque of engine 13, and "Tm1" represents a torque obtained by converting torque Tm of second MG 15 on the output element. The sum of Tep and Tm1 corresponds to a torque output to countershaft 25 (eventually, drive shafts 32, 33). The up arrow represents a positive-going torque, a down arrow represents a negative-going torque, and an allow length represents torque magnitude.

Referring to FIGS. 5 and 6, the dotted line in FIG. 6 represents the relationship before engine speed Ne is increased, and corresponds to the line shown in FIG. 5. The relationship between torque Te of engine 13 and torque Tg of first MG 14 is uniquely determined by the gear ratio of planetary gear mechanism 20. Thus, first MG 14 can be controlled such that the rotation speed of first MG 14 increases with torque Tg of first MG 14 maintained, thereby increasing engine speed Ne of engine 13 with the driving torque maintained.

Also, referring to FIGS. 5 and 7, engine 13 can be controlled such that the output (power) of engine 13 is increased, thereby increasing torque Te of engine 13. At this time, torque Tg of first MG 14 can be increased such that the rotation speed of first MG 14 does not increase, thereby increasing torque Te of engine 13 with engine speed Ne of engine 13 maintained. Since engine direct torque Tep increases along with an increase in torque Te, second MG 15 can be controlled such that torque Tm1 decreases, thereby maintaining the torque of the drive shaft.

When torque Te of engine 13 is increased, torque Tg of first MG 14 increases, leading to an increase in the power generated by first MG 14. At this time, if charging of power storage device 18 is not restricted, power storage device 18 can be charged with the generated power which has been increased.

Although not particularly shown, controlling engine 13 can be controlled such that the output (power) of engine 13 decreases, thereby reducing torque Te of engine 13. At this time, torque Tg of first MG 14 can be reduced such that the rotation speed of first MG 14 does not decrease, thereby reducing torque Te of engine 13 with engine speed Ne of engine 13 maintained. In this case, torque Tg of first MG 14 decreases, leading to a decrease in the power generated by first MG 14. At this time, if discharging of power storage device 18 is not restricted, discharging by power storage device 18 can be increased to compensate for an amount of the decrease in the power generated by first MG 14.

Referring to FIG. 4 again, a line L3 represents a recommended operation line of engine 13. In other words, engine 13 is usually controlled to move on the recommended operation line (line L3) in which the operating point determined by torque Te and engine speed Ne is set in advance.

Figure 8:
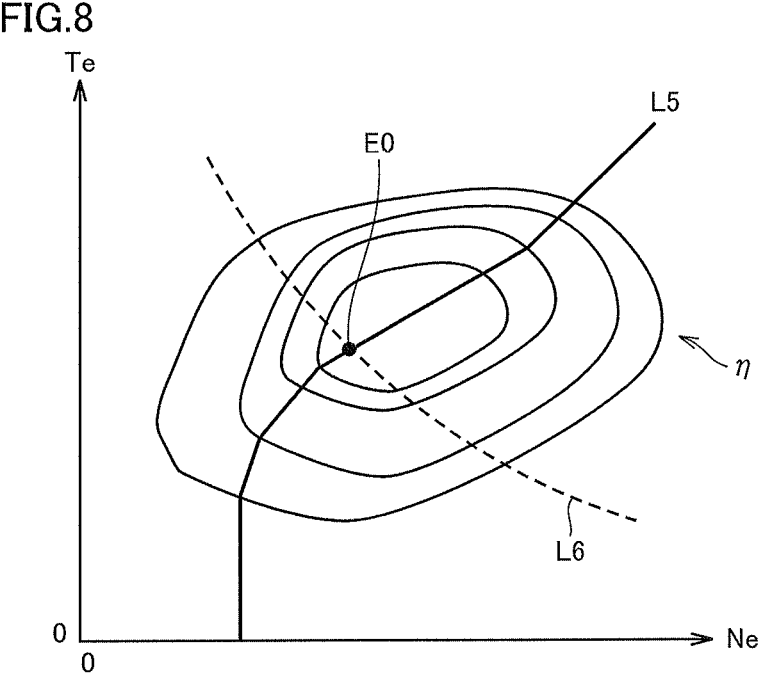
FIG. 8 shows an optimum fuel efficiency line which is an example recommended operation line.

FIG. 8 shows an optimum fuel efficiency line which is an example recommended operation line of engine 13. Referring to FIG. 8, a line L5 is an operation line set in advance by initial assessment test or simulation to obtain minimum fuel consumption of engine 13. The operating point of engine 13 is controlled to be located on line L5, leading to optimum (minimum) fuel consumption of engine 13 for the requested power. A dotted line L6 is an isopower line of engine 13 which corresponds to the requested power. Fuel consumption of engine 13 is optimized (minimized) by controlling engine 13 such that the operating point of engine 13 is a point at intersection E0 of dotted line L6 with line L5. A group of closed curves η in FIG. 8 shows an isoefficiency line of engine 13, in which the efficiency of engine 13 is higher as closer to the center.

<Case Where Operating Point is Located Within Area A Upon Request for Purge>

Referring to FIG. 4 again, in hybrid vehicle 10, upon request for fuel purge by purge device 70, when operating point E of engine 13 is included in area A, operating point E is moved to outside of area A. In the present embodiment, in which direction operating point E is moved is determined as follows, for example.

First, in the case where charging of power storage device 18 is not restricted and discharging of power storage device 18 is restricted, operating point E is moved such that torque Te increases with changes in engine speed Ne limited (k11 direction). When operating point E is moved in the direction in which torque Te decreases, an outflow (discharging power) of power storage device 18 increases by an amount of decrease in engine power. In the case where discharging of power storage device 18 is restricted, thus, it is not desirable to move operating point E in the direction in which torque Te decreases. Contrastingly, when operating point E is moved in the direction in which torque Te increases, the power generated by first MG 14 increases by an amount of increase in engine power. In the case where charging of power storage device 18 is not restricted, thus, power storage device 18 can be charged with the generated power which has been increased. Also, limiting changes in engine speed Ne can reduce the sense of discomfort associated with the changes in operating point E (changes in engine speed which are unintended by the user).

The case where discharging of power storage device 18 is restricted is the case where, for example, the discharging power of power storage device 18 is limited because it has reached an upper limit Wout. Upper limit Wout of discharging power can be small in a low SOC state of power storage device 18 or at very low temperature. The case where charging of power storage device 18 is not restricted is the case where, for example, the charging power of power storage device 18 is not limited by an upper limit Win. Upper limit Win of charging power can be small in a high SOC state or at very low temperature.

Second, in the case where discharging of power storage device 18 is not restricted and charging of power storage device 18 is restricted, operating point E is moved such that torque Te decreases with changes in engine speed Ne limited (k12 direction). When operating point E is moved in the direction in which torque Te increases, the charging power of power storage device 18 increases by an amount of an increase in engine power. In the case where charging of power storage device 18 is restricted, thus, it is not desirable to move operating point E in the direction in which torque Te increases. Contrastingly, when operating point E is moved in the direction in which torque Te decreases, an outflow (discharging power) of power storage device 18 increases by an amount of the decrease in engine power. In the case where discharging of power storage device 18 is not restricted, thus, discharging of power storage device 18 can be increased to compensate for the amount of decrease in engine power. Also, limiting changes in engine speed Ne can reduce the sense of discomfort associated with the changes in operating point E (changes in engine rotation speed which are unintended by the user).

The case where charging of power storage device 18 is restricted is the case where, for example, the charging power of power storage device 18 is limited because it has reached upper limit Win. The case where discharging of power storage device 18 is not restricted is the case where, for example, the discharging power of power storage device 18 is not limited by upper limit Wout.

Third, in the case where charging and discharging of power storage device 18 are restricted, operating point E is moved such that torque Te decreases with changes in power Pe of engine 13 limited (k13 direction). When charging and discharging of power storage device 18 are restricted, it is not desirable to change the power of engine 13, so operating point E is moved along an isopower line L41. In this case, of the supercharging area and NA area, the NA area has a higher degree of torque accuracy. Thus, operating point E is moved in the k13 direction such that torque Te decreases, thereby moving operating point E to the NA area.

Although not particularly shown, in the case where both of charging and discharging of power storage device 18 are not restricted, operating point E may be moved in the k11 direction or k12 direction in accordance with the SOC of power storage device 18. Specifically, operating point E may be moved in the k11 direction when the SOC is lower than a prescribed value, and operating point E may be moved in the k12 direction when the SOC is higher than the prescribed value.

<Case Where Operating Point Passes Through Area A Along With Increase in Requested Output During Fuel Purge>

Figure 9:
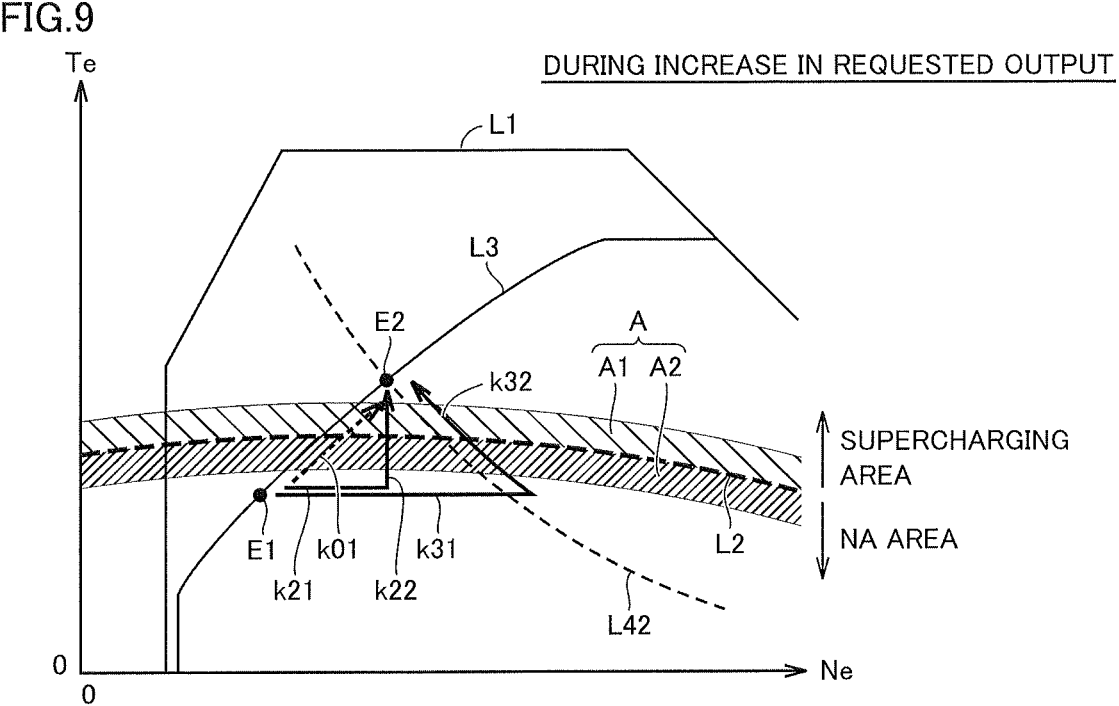
FIG. 9 is a chart for illustrating a movement of the operating point when an operating point of the engine passes through an area A along with an increase in requested output during fuel purge.

FIG. 9 is a chart for illustrating a movement of the operating point in the case where the operating point of engine 13 passes through area A along with an increase in requested output during fuel purge by purge device 70. Referring to FIG. 9, during fuel purge, the operating point of engine 13 moves along line L3 (recommended operation line) along with an increase in requested output, and when the operating point reaches E1 before entering area A, the operating point is moved such that torque Te does not increase (k21). Then, when engine speed Ne reaches a value at which torque Te exceeds that of area A on line L3 (the engine speed corresponding to operating point E2), the operating point is moved such that torque Te increases with changes in engine speed Ne limited (k22). Consequently, a period of time in which the operating point is included in area A can be made shorter than in the case where the operating point is moved along line L3 (dotted line k01).

When operating point reaches E1, first, the operating point may be moved such that torque Te increases with changes in engine speed Ne limited, and when torque Te reaches the torque corresponding to operating point E2, engine speed Ne may be increased to move the operating point to E2. When the operating point crosses supercharge line L2, however, various settings (e.g., setting of fuel injection amount) need to be switched because the fuel purge switches from downstream purge to upstream purge. Considering a purge switch made again when the operating point returns to E1 as a result of the requested output shifting to decrease, thus, it is more preferred that the operating point be moved from E1 to E2 along k21 and k22, as shown in FIG. 9.

When torque Te is increased with changes in engine speed Ne limited (k22), torque Tg of first MG 14 increases along with an increase in torque Te, leading to an increase in the power generated by first MG 14. In the case where charging of power storage device 18 is restricted, this increase in generated power cannot be absorbed by power storage device 18, and accordingly, the movement of the operating point along k22 is not desirable.

Thus, in the case where charging of power storage device 18 is restricted, the operating point is moved until the power of engine 13 reaches the power corresponding to operating point E2 (k31), and then, the operating point is moved along isopower line L42 to E2 (k32). This leads to a lower degree of increase in the power of engine 13 than in the case where the operating point is moved along k21 and k22, and even when charging of power storage device 18 is restricted, the operating point can be moved to E2. Although the engine power increases also by increasing engine speed Ne with an increase in torque Te restrained, the degree of increase in engine power can be restrained more in the case where engine speed Ne is increased along k31 and the operating point is then moved along k32 on isopower line L42 than in the case where torque Te is increased along k22.

It is also conceivable that the operating point will be moved along k31 and k32 also in the case where charging of power storage device 18 is not restricted. In this case, however, engine speed Ne decreases while the operating point is moving along k32 even though requested output increases, so that the driver may feel discomfort. In the case where charging of power storage device 18 is not restricted, it is thus more preferred that the operating point be moved along k21 and k22 as described above.

<Case Where Operating Point Passes Through Area A Along With Decrease in Requested Power During Purging>

Figure 10:
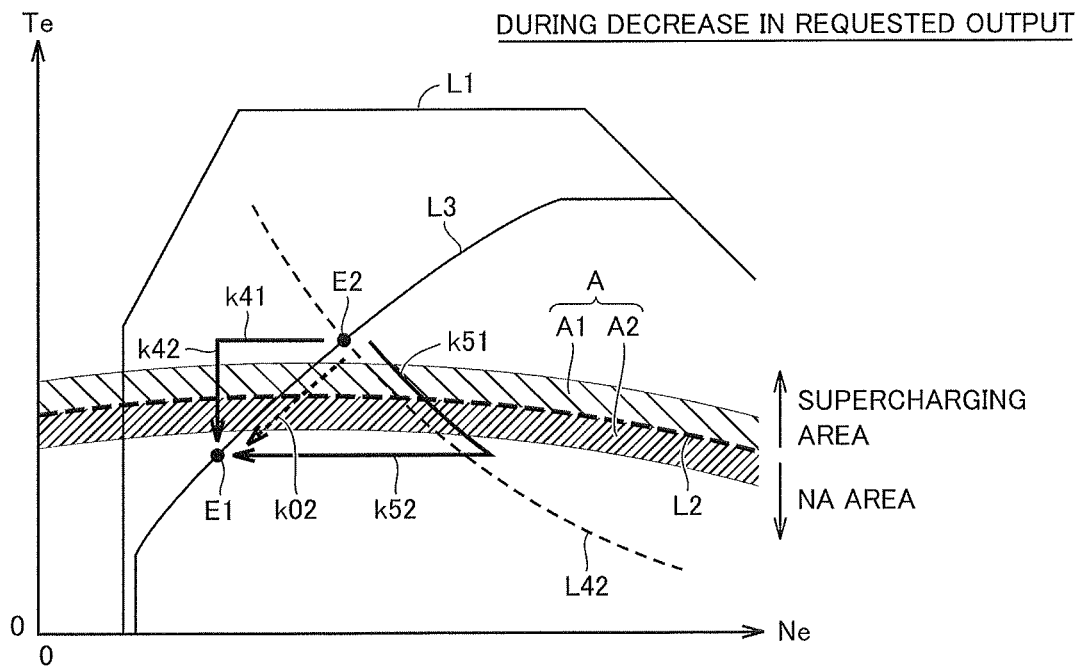
FIG. 10 is a chart for illustrating a movement of the operating point when the operating point of the engine passes through area A along with a decrease in requested output during fuel purge.

FIG. 10 is a chart for illustrating a movement of the operating point in the case where the operating point of engine 13 passes through area A along with a decrease in requested power during fuel purge by purge device 70. Referring to FIG. 10, the operating point of engine 13 moves along line L3 (recommended operation line) along with a decrease in requested power during fuel purge, and when the operating point reaches E2 before entering area A, the operating point is moved such that torque Te does not decrease (k41). Then, when engine speed Ne reaches a value (the engine speed corresponding to operating point E1) at which torque Te falls below that of area A on line L3, the operating point is moved such that torque Te decreases with changes in engine speed Ne limited (k42). This can lead to a shorter period of time in which the operating point is included in area A than in the case where the operating point is moved along line L3 (dotted line k02).

When the operating point reaches E2, first, the operating point may be moved such that torque Te decreases with changes in engine speed Ne limited, and when torque Te decreases to the torque corresponding to operating point E1, engine speed Ne may be reduced to move the operating point to E1. When the operating point crosses supercharge line L2, however, various settings (e.g., setting of fuel injection amount) need to be switched because the fuel purge switches from upstream purge to downstream purge, as described above. Considering a purge switch made again when the operating point returns to E2 as a result of the requested output shifting to increase, thus, it is more preferred that the operating point be moved from E2 to E1 along k41 and k42, as shown in FIG. 10.

When torque Te is reduced with changes in engine speed Ne limited (k42), torque Tg of first MG 14 decreases along with a decrease in torque Te, thus increasing an outflow (discharging power) of power storage device 18 due to decreased power generated by first MG 14. In the case where discharging of power storage device 18 is restricted, thus, the movement of the operation point along k42 is not desirable.

In the case where discharging of power storage device 18 is restricted, thus, the operating point is moved from E2 along isopower line L42 (k51), and when torque Te falls below that of area A, the operating point is moved to E1 (k52). This can restrain a degree of decrease in the power of engine 13 more than in the case where the operating point is moved along k41 and k42, thereby moving the operating point to E1 even when discharging of power storage device 18 is restricted. Although engine power decreases also when engine speed Ne is reduced along k52, a degree of decrease in engine power can be restrained more than in the case where torque Te is reduced along k42.

It is also conceivable that the operating point will be moved along k51 and k52 also in the case where discharging of power storage device 18 is not restricted. In this case, however, engine speed Ne increases while the operating point is moving along k51 even though requested output decreases, so that the driver may feel discomfort. In the case where discharging of power storage device 18 is not restricted, thus, it is more preferred that the operating point be moved along k41 and k42, as described above.

<Description of Basic Computation Process of Operating Point>

Figure 11:
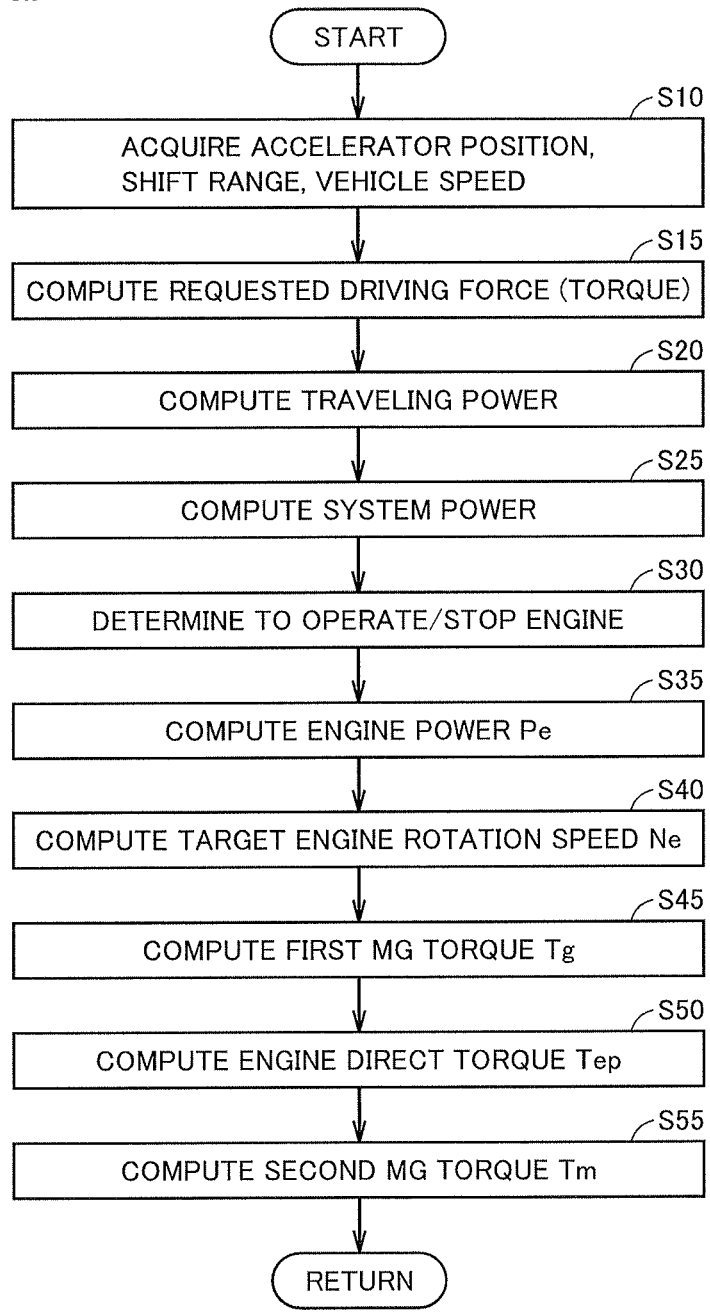
FIG. 11 is a flowchart showing an example basic computation process for determining the operating points of the engine, the first MG, and the second MG.

FIG. 11 is a flowchart showing an example basic computation process for determining the operating points of engine 13, first MG 14, and second MG 15. A series of processes shown in this flowchart are repeatedly performed for each prescribed period in HV-ECU 102.

Referring to FIG. 11, HV-ECU 102 acquires information on, for example, an accelerator position, a shift range being selected, and a vehicle speed (step S10). The accelerator position is detected by accelerator position sensor 111, and the vehicle speed is detected by vehicle speed sensor 110. The rotation speed of a drive shaft or propeller shaft may be used in place of the vehicle speed.

HV-ECU 102 then computes a requested driving force (torque) from the information acquired at step S10 using a drive force map prepared in advance per shift range, which indicates the relationship among requested driving force, accelerator position, and vehicle speed (step S15). HV-ECU 102 then multiplies the computed requested driving force by the vehicle speed and adds prescribed loss power to a result of the multiplication, thereby computing traveling power of the vehicle (step S20).

Then, when there is a charge/discharge request (power) of power storage device 18, HV-ECU 102 computes a value obtained by adding the charge/discharge request (charge has a positive value) to the computed traveling power as system power (step S25). For example, the charge/discharge request can have a greater positive value as the SOC of power storage device 18 is lower and have a negative value when the SOC is high.

HV-ECU 102 then determines to operate/stop engine 13 in accordance with the computed system power and traveling power (step S30). For example, when system power is greater than a first threshold or when traveling power is greater than a second threshold, HV-ECU 102 determines to operate engine 13.

Then, when determining to operate engine 13, HV-ECU 102 performs the process of step S35 and the following processes (HV traveling mode). Although not specifically shown, when determining to stop engine 13 (EV traveling mode), HV-ECU 102 computes torque Tm of second MG 15 based on the requested driving force.

During operation of engine 13 (during the HV traveling mode), HV-ECU 102 computes power Pe of engine 13 from the system power computed at step S25 (step S35). Power Pe is computed by, for example, making various corrections to or imposing limitations on system power. The computed power Pe of engine 13 is output to engine ECU 104 as a power command of engine 13.

HV-ECU 102 then computes an engine speed Ne (target engine rotation speed) of engine 13 (step S40). In the present embodiment, engine speed Ne is computed such that the operating point of engine 13 is located on line L3 (recommended operation line) shown in, for example, FIG. 4. Specifically, the relationship between power Pe and engine speed Ne in which the operating point of engine 13 is located on line L3 (recommended operation line) is prepared as a map or the like in advance, and engine speed Ne is computed from power Pe computed at step S35 using the map. When engine speed Ne is determined, torque Te (target engine torque) of engine 13 is also determined. Consequently, the operating point of engine 13 is determined.

HV-ECU 102 then computes torque Tg of first MG 14 (step S45). Torque Te of engine 13 can be estimated from engine speed Ne of engine 13, and the relationship between torque Te and torque Tg is uniquely determined in accordance with the gear ratio of planetary gear mechanism 20, and thus, torque Tg can be computed from engine speed Ne. The computed torque Tg is output to MG-ECU 103 as a torque command of first MG 14.

HV-ECU 102 further computes engine direct torque Tep (step S50). Since the relationship between engine direct torque Tep and torque Te (or torque Tg) is uniquely determined in accordance with the gear ratio of planetary gear mechanism 20, engine direct torque Tep can be computed from the computed torque Te or torque Tg.

HV-ECU 102 finally computes torque Tm of second MG 15 (step S50). Torque Tm is determined such that the requested driving force (torque) computed at step S15 can be obtained, and can be computed by subtracting engine direct torque Tep from the requested driving force converted on the output shaft. The computed torque Tm is output to MG-ECU 103 as the torque command of second MG 15.

As described above, the operating point of engine 13 and the operating points of first MG 14 and second MG 15 are computed.

<Description of Control of Operating Point During Fuel Purge>

Figure 12:
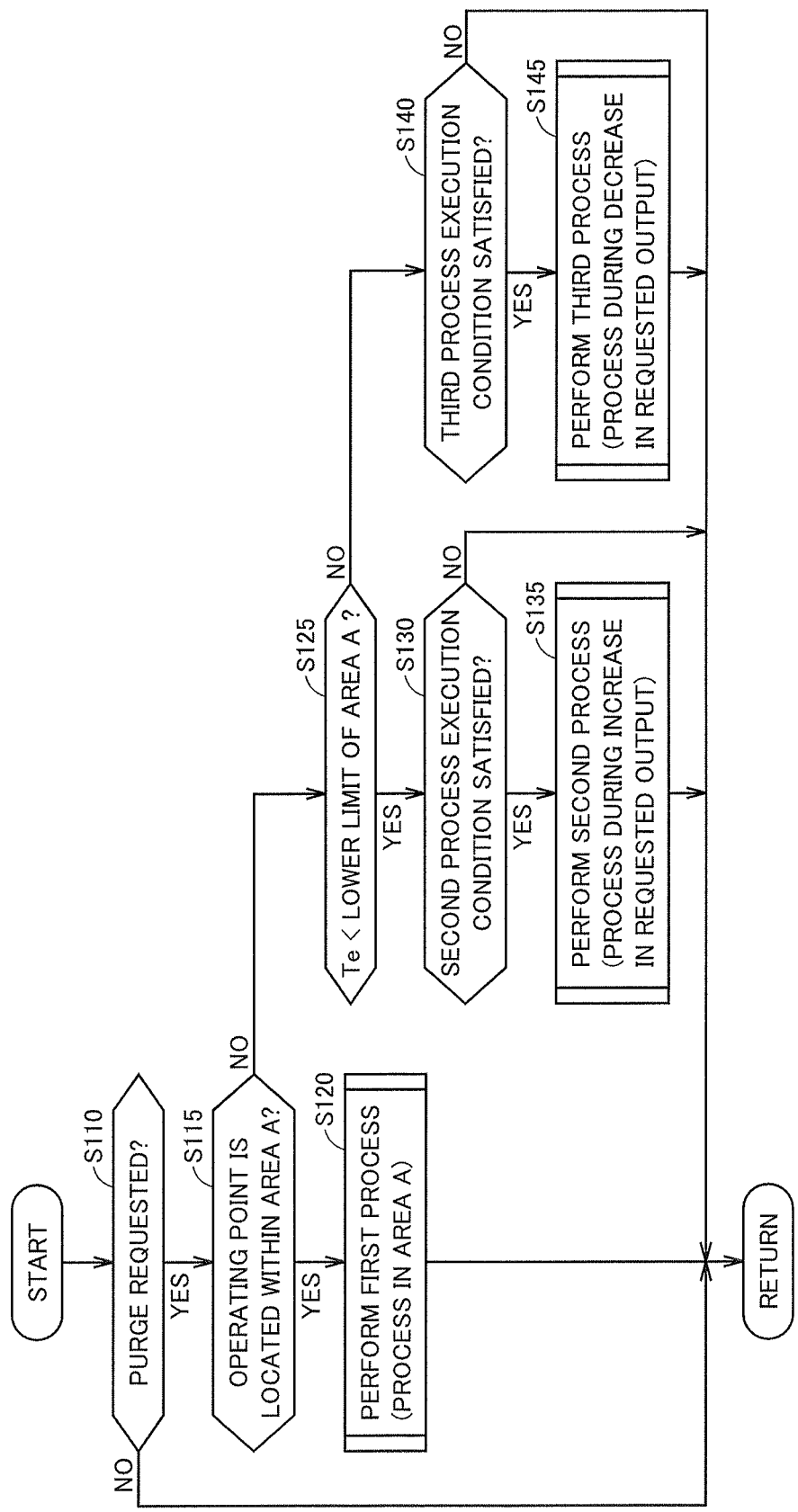
FIG. 12 is a flowchart showing an example processing procedure of operating point control during fuel purge.

FIG. 12 is a flowchart showing an example processing procedure of control of an operating point during fuel purge. The processes shown in this flowchart are performed by HV-ECU 102 during the HV traveling mode.

Referring to FIG. 12, HV-ECU 102 determines whether fuel purge has been requested (step S110). For example, when the vapor concentration in canister 73 exceeds a threshold, fuel purge is requested. When fuel purge has not been requested (NO at step S110), a series of processes are not performed, and the process proceeds to RETURN.

When determining at step S110 that fuel purge has been requested (YES at step S110), HV-ECU 102 determines whether the operating point of engine 13 is located within area A shown in FIG. 4 (step S115). When determining that the operating point of engine 13 is located within area A (YES at step S115), HV-ECU 102 performs a first process, namely, a process in area A (step S120). Specifically, the first process is a process for moving the operating point described with reference to FIG. 4. The first process will be described below in detail.

When determining at step S115 that the operating point of engine 13 is not located within area A (NO at step S115), HV-ECU 102 determines whether torque Te of engine 13 is smaller than a lower limit of area A (step S125).

When determining that torque Te is smaller than the lower limit of area A (YES at step S125), HV-ECU 102 determines whether a second process execution condition is satisfied (step S130). The second process execution condition is satisfied when the requested output has increased and torque Te is close to the lower limit of area A (e.g., a difference between the lower limit of area A and torque Te is not greater than a threshold). Then, when determining that the second process execution condition is satisfied (YES at step S130), HV-ECU 102 performs a second process, namely, a process during increase in requested output (step S135). Specifically, the second process is a process for moving the operating point as described with reference to FIG. 9. The second process will also be described below in detail. When determining at step S130 that the second process execution condition is not satisfied (NO at step S130), the process of step S135 is not performed, and the process proceeds to RETURN.

When determining at step S125 that torque Te is not less than the lower limit of area A (NO at step S125), HV-ECU 102 determines whether a third process execution condition is satisfied (step S140). When determining at step S125 that torque Te is not less than the lower limit of area A, it has been determined at step S115 that the operating point has not been located within area A. It is thus determined that torque Te has exceeded the upper limit of area A.

The third process execution condition is satisfied when the requested output has decreased and torque Te is close to the upper limit of area A (e.g., a difference between torque Te and the upper limit of area A is not greater than a threshold). Then, when determining that the third process execution condition is satisfied (YES at step S140), HV-ECU 102 performs a third process (process during decrease in requested output) (step S145). Specifically, the third process is a process for moving the operating point which has been described with reference to FIG. 10. The third process will also be described below in detail. When it is determined at step S140 that the third process execution condition is not satisfied (NO at step S140), the process of step S145 is not performed, and the process proceeds to RETURN.

Figure 13:
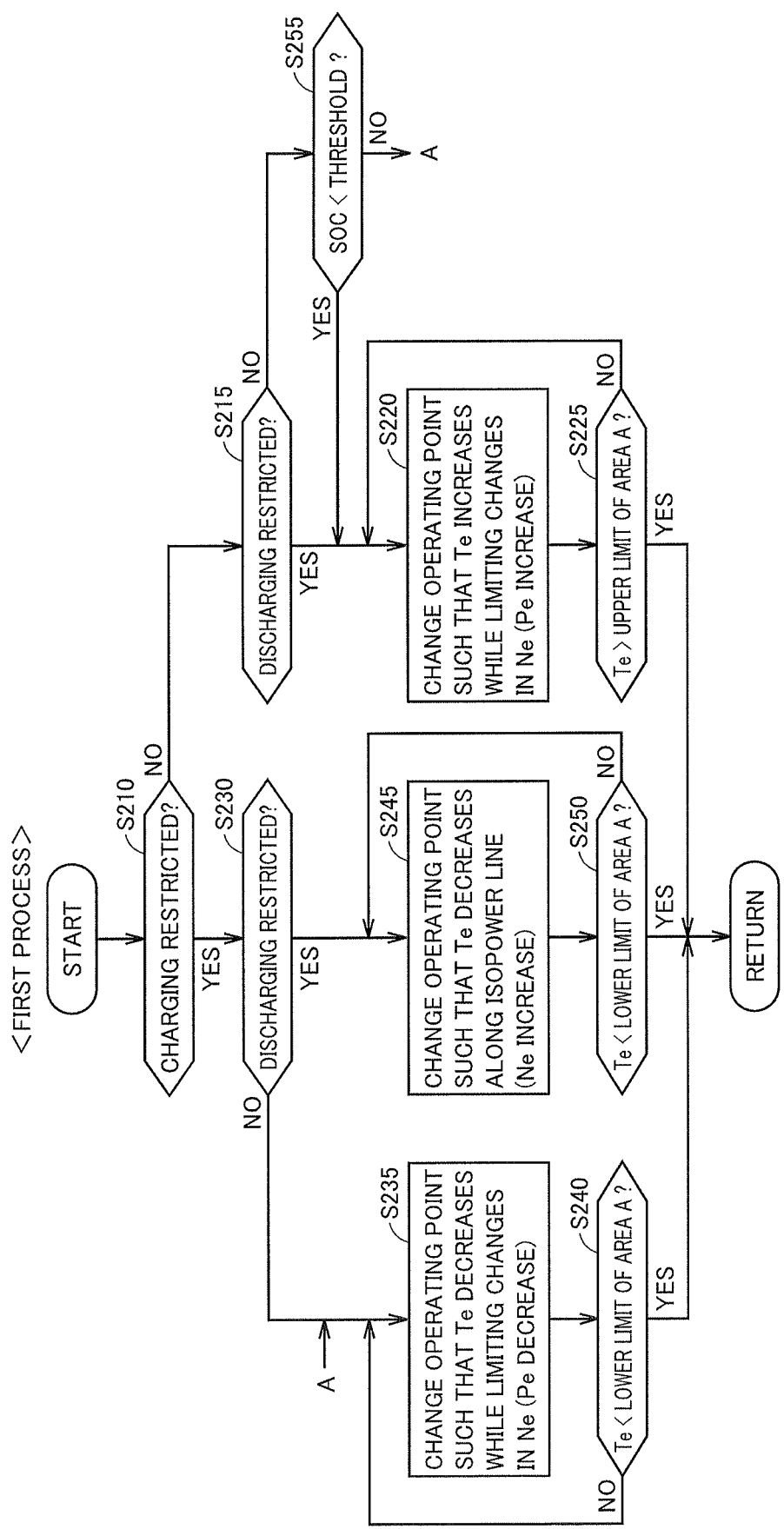
FIG. 13 is a flowchart showing an example procedure of a first process performed at step S120 in FIG. 12.

FIG. 13 is a flowchart showing an example procedure of the first process performed at step S120 in FIG. 12. The first process is a process for moving the operating point which has been described with reference to FIG. 4. Referring to FIG. 13, HV-ECU 102 determines whether charging of power storage device 18 is being restricted (step S210). For example, it is determined that charging is being restricted when the charging power of power storage device 18 is limited by upper limit Win.

When it is determined that charging is not being restricted (NO at step S210), HV-ECU 102 determines whether discharging of power storage device 18 is being restricted (step S215). For example, it is determined that discharging is being restricted when the discharging power of power storage device 18 is limited by upper limit Wout.

When determining that discharging is being restricted (YES at step S215), HV-ECU 102 changes the operating point of engine 13 such that torque Te increases while limiting changes in engine speed Ne (step S220). This change of the operating point corresponds to k11 in FIG. 4. Power Pe of engine 13 increases as a result of the increase in torque Te, and the power generated by first MG 14 increases. The increased generated power is then stored in power storage device 18.

HV-ECU 102 then performs the process of step S220 until torque Te exceeds the upper limit of area A (NO at step S225), and when torque Te exceeds the upper limit of area A (YES at step S225), moves the process to RETURN.

Also when determining at step S210 that charging is being restricted (YES at step S210), HV-ECU 102 determines whether discharging of power storage device 18 is being restricted (step S230). Then, when determining that discharging is not being restricted (NO at step S230), HV-ECU 102 changes the operating point of engine 13 such that torque Te decreases while limiting changes in engine speed Ne (step S235). This change of the operating point corresponds to k12 in FIG. 4. Power Pe of engine 13 decreases as a result of the decrease in torque Te, and an outflow (discharging power) of power storage device 18 increases.

HV-ECU 102 then performs the process of step S235 until torque Te falls below the lower limit of area A (NO at step S240), and as torque Te falls below the lower limit of area A (YES at step S240), moves the process to RETURN.

Contrastingly, when determining at step S230 that discharging is being restricted (YES at step S230), HV-ECU 102 changes the operating point such that torque Te decreases along the isopower line (step S245). This change of the operating point corresponds to k13 in FIG. 4. In this case, engine speed Ne of engine 13 increases by reducing torque Te along the isopower line.

HV-ECU 102 then performs the process of step S245 until torque Te falls below the lower limit of area A (NO at step S250), and when torque Te falls below the lower limit of area A (YES at step S250), moves the process to RETURN.

When determining at step S215 that discharging is not being restricted (NO at step S215), that is, when charging is not being restricted and discharging is not restricted, HV-ECU 102 determines whether the SOC of power storage device 18 is lower than a threshold (step S255). Then, when the SOC is lower than the threshold (YES at step S225), HV-ECU 102 moves the process to step S220. Consequently, the SOC increases. Contrastingly, when determining at step S255 that the SOC is not less than the threshold (NO at step S255), HV-ECU 102 moves the process to step S235. Consequently, the SOC decreases.

Figure 14:
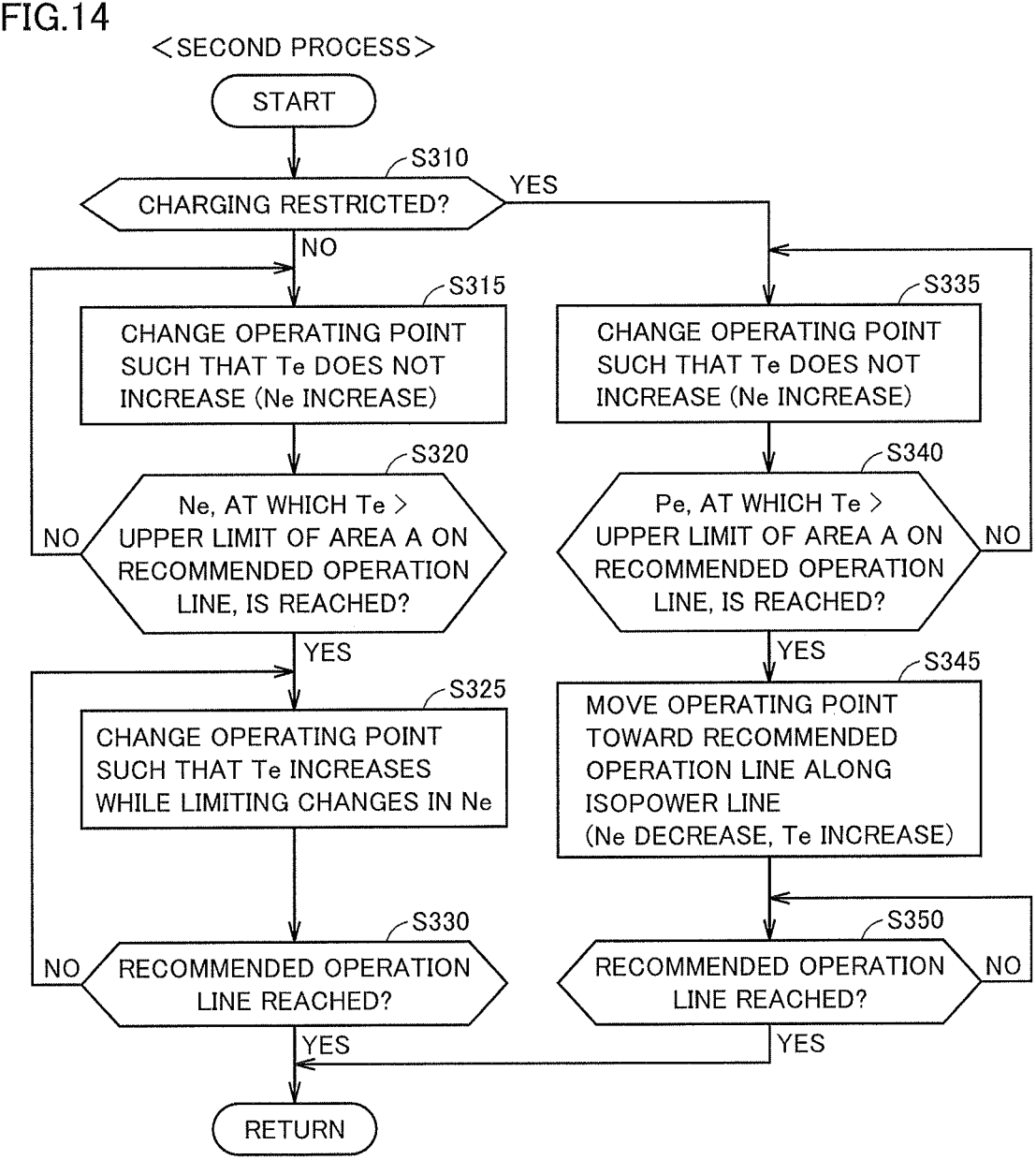
FIG. 14 is a flowchart showing an example procedure of a second process performed at step S135 in FIG. 12.

FIG. 14 is a flowchart showing an example procedure of the second process performed at step S135 in FIG. 12. The second process is a process for moving the operating point which has been described with reference to FIG. 9. Referring to FIG. 14, HV-ECU 102 determines whether charging of power storage device 18 is being restricted (step S310).

When determining that charging is not being restricted (NO at step S310), HV-ECU 102 changes the operating point of engine 13 such that torque Te does not increase (step S315). This change of the operating point corresponds to k21 in FIG. 9. Although torque Te does not increase, engine speed Ne of engine 13 increases along with an increase in requested output.

HV-ECU 102 then determines whether engine speed Ne has reached a value (the engine speed corresponding to operating point E2 in FIG. 9) at which torque Te exceeds the upper limit of area A on the recommended operation line, namely, line L3 in FIG. 9 (step S320). Then, HV-ECU 102 performs the process of step S315 until engine speed Ne reaches the above value (NO at step S320), and when engine speed Ne reaches the above value (YES at step S320), changes the operating point of engine 13 such that torque Te increases while limiting changes in engine speed Ne (step S325). This change of the operating point corresponds to k22 in FIG. 9.

HV-ECU 102 performs the process of step S325 until the operating point reaches the recommended operation line (NO at step S330), and when the operating point reaches the recommended operation line (YES at step S330), moves the process to RETURN.

Contrastingly, also when determining at step S310 that charging is being restricted (YES at step S310), HV-ECU 102 changes the operating point of engine 13 such that torque Te does not increase (step S335). This change of the operating point corresponds to k31 in FIG. 9.

HV-ECU 102 then determines whether power Pe of engine 13 has reached a value (power corresponding to operating point E2 in FIG. 9) at which torque Te exceeds the upper limit of area A on the recommended operation line (step S340). HV-ECU 102 then performs the process of step S335 until power Pe reaches the above value (NO at step S340), and when power Pe reaches the above value (YES at step S340), moves the operating point toward the recommended operation line along the isopower line (step S345). This change of the operating point corresponds to k32 in FIG. 9. In other words, engine speed Ne of engine 13 decreases, and torque Te increases.

HV-ECU 102 then performs the process of step S345 until the operating point reaches the recommended operation line (NO at step S350), and when the operating point reaches the recommended operation line (YES at step S350), moves the process to RETURN.

Figure 15:
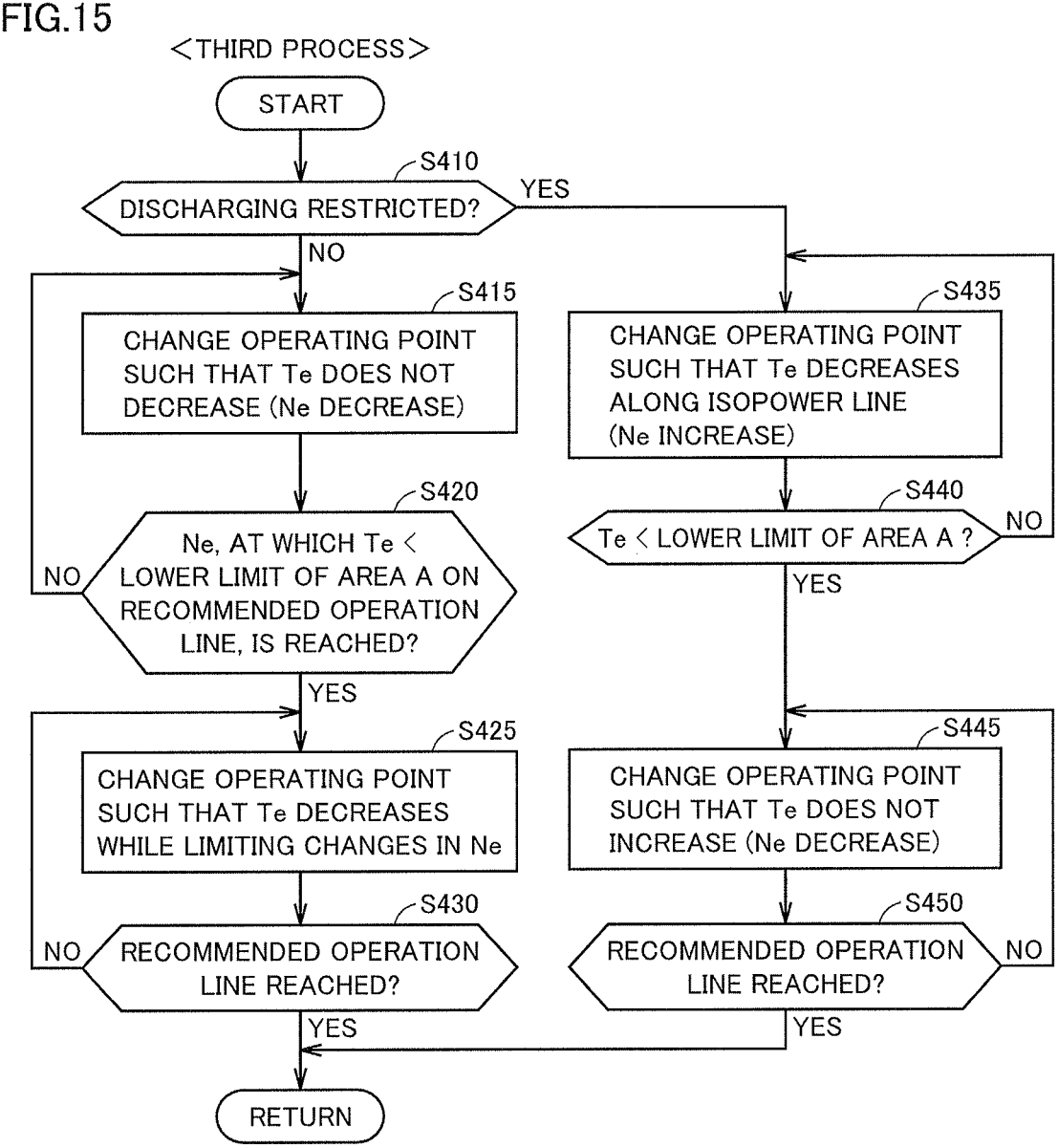
FIG. 15 is a flowchart showing an example procedure of a third process performed at step S145 in FIG. 12.

FIG. 15 is a flowchart showing an example procedure of the third process performed at step S145 in FIG. 12. The third process is a process for moving the operating point which has been described with reference to FIG. 10. Referring to FIG. 15, HV-ECU 102 determines whether discharging of power storage device 18 is being restricted (step S410).

When determining that discharging is not being restricted (NO at step S410), HV-ECU 102 changes the operating point of engine 13 such that torque Te does not decrease (step S415). This change of the operating point corresponds to k41 in FIG. 10. Although torque Te does not decrease, engine speed Ne of engine 13 decreases along with a decrease in requested output.

HV-ECU 102 then determines whether engine speed Ne has reached a value (the engine speed corresponding to operating point E1 in FIG. 10) at which torque Te falls below the lower limit of area A on the recommended operation line, namely, line L3 in FIG. 10 (step S420). HV-ECU 102 then performs the process of step S415 until engine speed Ne reaches the above value (NO at step S420), and when engine speed Ne reaches the above value (YES at step S420), changes the operating point of engine 13 such that torque Te decreases while limiting changes in engine speed Ne (step S425). This change of the operating point corresponds to k42 in FIG. 10.

HV-ECU 102 performs the process of step S425 until the operating point reaches the recommended operation line (NO at step S430), and when the operating point reaches the recommended operation line (YES at step S430), moves the process to RETURN.

Contrastingly, when determining at step S410 that discharging is being restricted (YES at step S410), HV-ECU 102 changes the operating point such that torque Te decreases along the isopower line (step S435). This changes of the operating point corresponds to k51 in FIG. 10. In this case, engine speed Ne of engine 13 increases by reducing torque Te along the isopower line.

HV-ECU 102 performs the process of step S435 until torque Te falls below the lower limit of area A (NO at step S440), and when torque Te falls below the lower limit of area A (YES at step S440), changes the operating point of engine 13 such that torque Te does not increase (step S445). This change of the operating point corresponds to k52 in FIG. 10. Although torque Te does not increase, engine speed Ne of engine 13 decreases along with a decrease in requested output.

HV-ECU 102 then performs the process of step S445 until the operating point reaches the recommended operation line (NO at step S450), and when the operating point reaches the recommended operation line (YES at step S450), moves the process to RETURN.

As described above, upon request for fuel purge by purge device 70, when the operating point of engine 13 is included in area A (e.g., FIG. 4) in which an amount of fuel purge cannot be secured, the operating point is moved to outside of area A as shown in FIG. 4 in the present embodiment. Consequently, also upon request for fuel purge when the operating point of engine 13 is included in area A, fuel purge can be performed.

In the present embodiment, the operating point is moved as shown in FIG. 9 when fuel purge is requested and the operating point passes through area A along with an increase in requested power. Contrastingly, the operating point is moved as shown in FIG. 10 when the operating point passes through area A along with a decrease in requested power. This can make a period of time in which the operating point of engine 13 is located within area A as short as possible, thus avoiding an insufficient amount of fuel purge.

Although supercharger 54 is a turbo supercharger that performs supercharging using exhaust energy, it may be a supercharger of such a type that drives a compressor using the rotation of engine 13.

Although an embodiment of the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A hybrid vehicle comprising:
   an internal-combustion engine;
   a rotating electric machine;
   a planetary gear mechanism to which the internal-combustion engine, the rotating electric machine, and an output shaft are connected; and
   a controller that controls the internal-combustion engine and the rotating electric machine, wherein
   the internal-combustion engine includes
      a supercharger, and
      a purge device that introduces fuel vapor into an intake passage of the internal-combustion engine,
   when an operating point of the internal-combustion engine is included in a prescribed area in the case where fuel purge by the purge device is requested, the controller controls the internal-combustion engine and the rotating electric machine to move the operating point to outside of the prescribed area, and
   the prescribed area is an area defined, as an area in which an amount of fuel purge by the purge device is unable to be secured, by a supercharge line indicating a torque of the internal-combustion engine at which supercharging by the supercharger is started.

2. The hybrid vehicle according to claim 1, wherein
   the purge device includes
      an upstream purge mechanism that introduces fuel vapor into upstream of the supercharger using a differential pressure between downstream and upstream of the supercharger, the differential pressure occurring during supercharging by the supercharger, and
      a downstream purge mechanism that introduces fuel vapor into downstream of the supercharger using a negative pressure occurring in the intake passage during non-supercharging, and
   the prescribed area includes
      a first area defined as an area in which a torque of the internal-combustion engine is greater than that indicated by the supercharge line and an amount of fuel purge by the upstream purge mechanism is unable to be secured, and
      a second area defined as an area in which a torque of the internal-combustion engine is smaller than that indicated by the supercharge line and an amount of fuel purge by the downstream purge mechanism is unable to be secured.

3. The hybrid vehicle according to claim 1, further comprising a power storage device capable of storing electric power generated by the rotating electric machine,
   wherein when charging of the power storage device is not restricted and discharging of the power storage device is restricted, the controller controls the internal-combustion engine and the rotating electric machine such that a torque of the internal-combustion engine increases while limiting changes in an engine speed of the internal-combustion engine.

4. The hybrid vehicle according to claim 1, further comprising a power storage device capable of storing electric power generated by the rotating electric machine,
   wherein when discharging of the power storage device is not restricted and charging of the power storage device is restricted, the controller controls the internal-combustion engine and the rotating electric machine such that a torque of the internal-combustion engine decreases while limiting changes in an engine speed of the internal-combustion engine.

5. The hybrid vehicle according to claim 1, further comprising a power storage device capable of storing electric power generated by the rotating electric machine,
   wherein when charging and discharging of the power storage device are restricted, the controller controls the internal-combustion engine and the rotating electric machine such that a torque of the internal-combustion engine decreases while limiting changes in power of the internal-combustion engine.

6. The hybrid vehicle according to claim 1, wherein
   an operation line is set, the operation line defining an operating point of the internal-combustion engine in accordance with requested power for the internal-combustion engine, and
   during moving of the operating point along the operation line, when fuel purge by the purge device is requested and the operating point passes through the prescribed area along with an increase in the requested power,
before the operating point reaches the prescribed area, the controller controls the internal-combustion engine and the rotating electric machine such that a torque of the internal-combustion engine does not increase, and
upon an engine speed of the internal-combustion engine reaching a value at which a torque of the internal-combustion engine exceeds that of the prescribed area on the operation line, the controller controls the internal-combustion engine and the rotating electric machine such that a torque of the internal-combustion engine exceeds that of the prescribed area while limiting changes in the engine speed.

7. The hybrid vehicle according to claim 6, further comprising a power storage device capable of storing electric power generated by the rotating electric machine,
wherein when charging of the power storage device is restricted,
before the operating point reaches the prescribed area, the controller controls the internal-combustion engine and the rotating electric machine such that a torque of the internal-combustion engine does not increase, and
upon power of the internal-combustion engine reaching a value at which a torque of the internal-combustion engine exceeds that of the prescribed area on the operation line, the controller controls the internal-combustion engine and the rotating electric machine such that a torque of the internal-combustion engine exceeds that of the prescribed area while limiting changes in the power.

8. The hybrid vehicle according to claim 1, wherein
an operation line is set, the operation line defining an operating point of the internal-combustion engine in accordance with requested power for the internal-combustion engine, and
during moving of the operating point along the operation line, when fuel purge by the purge device is requested and the operating point passes through the prescribed area along with a decrease in the requested power,
before the operating point reaches the prescribed area, the controller controls the internal-combustion engine and the rotating electric machine such that a torque of the internal-combustion engine does not decrease, and
upon an engine speed of the internal-combustion engine reaching a value at which a torque of the internal-combustion engine falls below that of the prescribed area on the operation line, the controller controls the internal-combustion engine and the rotating electric machine such that a torque of the internal-combustion engine falls below that of the prescribed area while limiting changes in the engine speed.

9. The hybrid vehicle according to claim 8, further comprising a power storage device capable of storing electric power generated by the rotating electric machine,
wherein when discharging of the power storage device is restricted, the controller
controls the internal-combustion engine and the rotating electric machine such that a torque of the internal-combustion engine decreases while limiting changes in power of the internal-combustion engine, and
controls, upon a torque of the internal-combustion engine falling below that of the prescribed area, the internal-combustion engine and the rotating electric machine such that a torque of the internal-combustion engine does not increase until the operating point reaches the operation line.

* * * * *